Oct. 8, 1946.  L. A. MEKLER  2,408,943
CONVERSION OF HYDROCARBONS
Filed July 17, 1944
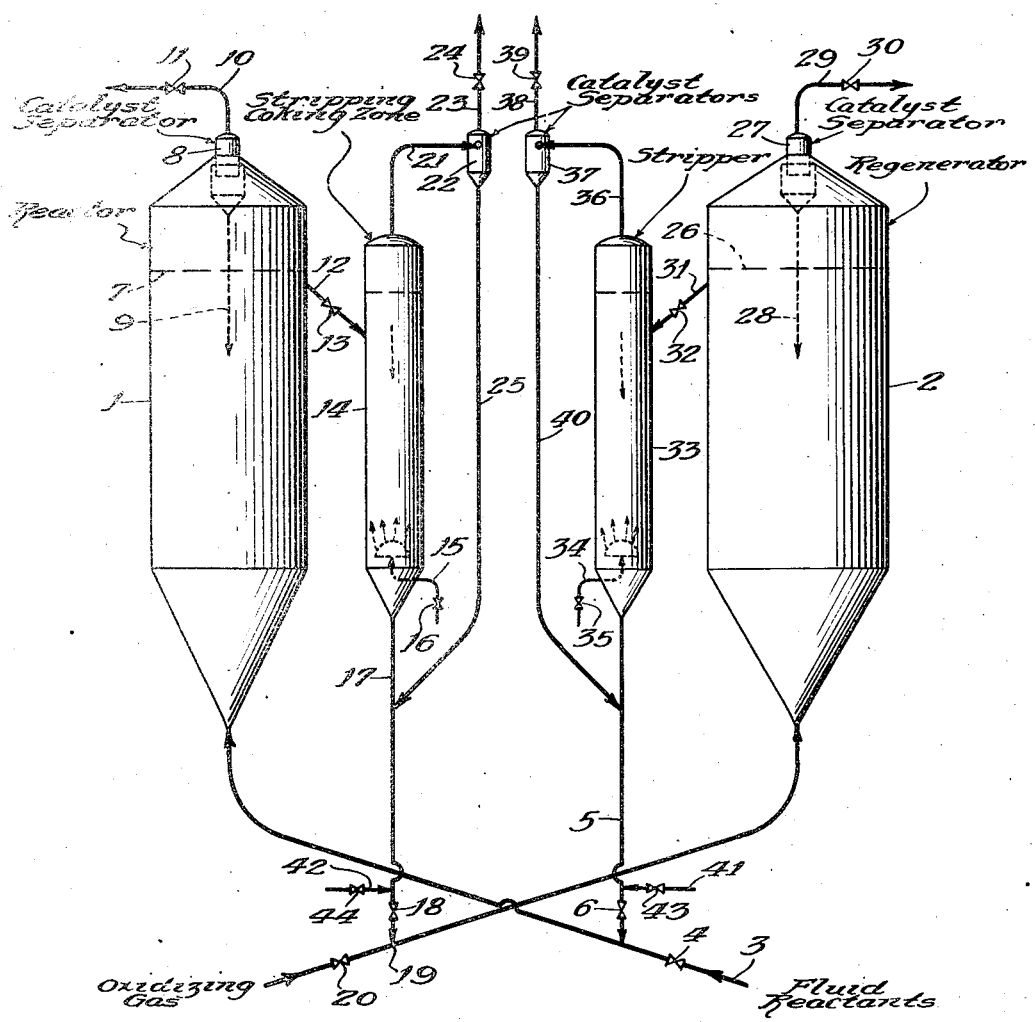

“Patented Oct. 8, 1946

2,408,943

UNITED STATES PATENT OFFICE 2,408,943

CONVERSION OF HYDROCARBONS

Lev A. Mekler, Chicago, Ill., assignor to Universal Oil Products Company, Chicago, Ill., a corporation of Delaware Application July 17, 1944, Serial No. 545,264

5 Claims. (Cl. 196—52)

This invention relates to an improved method for the conversion of hydrocarbons, and more particularly to an improved method of operating catalytic conversion processes in which the catalyst is continuously contacted with the hydrocarbons to be converted and then with the regenerating gases.

More specifically, this invention is concerned with a method of stripping adsorbed hydrocarbons or regeneration products from the catalyst before the latter is passed into the next contacting zone in the process.

One object of the invention is to reduce the quantity of air necessary for regenerating the catalyst.

Another object of the invention is to reduce the loading on subsequent fractionating equipment.

Another object of the invention is to reduce if not eliminate entirely the danger of afterburning occurring in the regenerator or regenerator exit duct and succeeding equipment.

Another object of the invention is to reduce the quantity of heat generated in the regeneration zone and thus eliminate or reduce the necessary means for dissipating this heat.

Briefly the invention comprises stripping and devolatilizing the contaminated catalyst withdrawn from the reactor with hot exit gases from the regenerator and stripping the regenerated catalyst withdrawn from the regenerator with tail gas from the refinery. The hot gases from the regenerator will remove vaporizable adsorbed materials from the catalyst and decompose by destructive distillation the remaining deposit on the catalyst to a coke of substantially uniform composition low in hydrocarbon content which may be burned with a better control of the CO to $CO_2$ ratio in the regenerator exit gas than the normally high volatile matter ordinarily deposited on the catalyst. By controlling the CO to $CO_2$ ratio a higher percentage of CO may be produced and consequently reduce the quantity of heat generated in the regenerator. Another advantage of the uniform coke deposition and absence of volatile matter on the catalyst is the reduction in the quantity of air necessary for regeneration because there is a smaller amount of material to be removed from the catalyst by combustion.

The exit gas from the stripping and coking zone for the unregenerated catalyst, because of its hydrocarbon gas and vapor and CO content, can provide a useful fuel for a variety of the fuel consuming units of the process or of the auxiliary equipment.

The catalyst leaving the regenerator ordinarily carries occluded oxygen and other oxidizing constituents which are advantageously removed before the catalyst enters the conversion zone. In the present invention this removal is accomplished by stripping the catalyst with lean refinery gases or tail gas from the process, preferably those consisting of one and two carbon atoms. The lean refinery or tail gases may be byproducts from the instant process or they may be reaction products from extraneous processes.

The conventional method of stripping the catalyst leaving the conversion and regeneration zone is by means of steam or other inert gases, the steam and stripped materials then commonly being introduced to the subsequent fractionating equipment. There are several disadvantages inherent to this type of operation, for example, it has been found that steam when contacted with catalyst at high temperatures causes a rapid loss of the catalyst activity. Also when the stripped material and steam are handled in the fractionating equipment it adds considerably to the loading thereon.

In one specific embodiment the present invention is concerned with a process for the conversion of hydrocarbons wherein finely divided catalyst particles are contacted in a conversion zone with hydrocarbons at conversion conditions, the contaminated catalyst continuously withdrawn and contacted in a regeneration zone with oxygen-containing gases to remove the contaminant by combustion and the regenerated catalyst continuously withdrawn and returned to the conversion zone with the improvement which comprises stripping said contaminated catalyst before it enters the regenerating zone with spent regenerating gas and stripping the regenerated catalyst before it enters the conversion zone with lean refinery gases.

The introduction of spent regenerated gases into the stripper is preferably made without intermediate cooling of the gases to assist the carbonizing and stripping operations, since in this manner they are carried out at relatively higher temperatures than are normally obtained with extraneous stripping agents such as inert gas, steam, etc.

Although the present invention is particularly adapted to the catalytic cracking of hydrocarbon oils it may also advantageously be employed in other processes such as dehydrogenation, hydroforming, aromatization, and the like.

The present invention may be applied to the so-called "fluidized" type of process or it may be applied to the so-called "moving bed" type of process.

In order to further illustrate the features and advantages of the present invention, reference is made to the accompanying diagrammatic drawing and the following description thereof in connection with a catalytic cracking process using the fluidized type of operation:

Referring to the drawing, 1 denotes the reactor and 2 the regenerator. The reactants are supplied to reactor 1 by means of line 3 controlled by valve 4 and pickup regenerated catalyst from line 5 controlled by valve 6. The combined stream of reactants and catalyst is then directed into the lower end of reactor 1 at such a rate that a dense phase of turbulent catalyst and reactants is formed in the lower portion of the reactor, the upper limit of this phase being indicated by broken line 7. The catalyst employed in this process may be any conventional cracking catalyst in finely divided form, the exact particle size being dependent upon the velocity of the upward flowing vapors in the reactor. In general, the particle size of the catalyst employed in a fluidized type of process is smaller than that which would be employed in a moving bed process. The latter type of process ordinarily employs catalyst in finely divided form having a particle size of from about $\frac{1}{16}''$ to $\frac{3}{8}''$ in average diameter.

The temperature normally employed in the reactor for the cracking of hydrocarbon oils is in the range of about 750 to 1000° F. with pressures of substantially atmospheric to superatmospheric.

Above the interface indicated by line 7 is a relatively light catalyst-vapor phase from which the vapors carrying some entrained catalyst discharge from the reactor through catalyst separator 8. Entrained catalyst is separated from the effluent vapor stream and returned to the dense phase in the reactor by means of conduit 9. The effluent stream of gases leaves the separator through line 10 controlled by valve 11 to be directed to subsequent fractionation and recovery equipment.

During the conversion of hydrocarbons, the catalyst becomes contaminated with carbonaceous and hydrocarbonaceous materials which eventually would decrease the activity of the catalyst below that at which the conversion would efficiently take place. It is, therefore, necessary to withdraw catalyst from the reactor as it becomes spent and this is accomplished by means of line 12 controlled by valve 13. The contaminated catalyst is directed into stripping and coking zone 14, which may be of smaller size as shown, the same size or larger than vessels 1 or 2 depending on the extent of devolatilization and stripping of the catalyst required, wherein it is contacted with an upward moving stream of hot exit gases from the regenerator which are introduced through line 15 controlled by valve 16. The catalyst in stripping and coking zone 14 is maintained at temperatures preferably above 900° F. for a time sufficient to coke the vaporizable hydrocarbons and strip the volatile matter from the catalyst. The catalyst is then removed by means of line 17 controlled by valve 18 and commingled in line 19 with oxidizing gas controlled by valve 20. In some instances when the regenerator exit gas does not contain sufficient heat for the coking step it may be passed through a heater before being introduced to stripping and coking zone 14, or oxygen containing gas may be added to the spent gas from the regenerator to partially burn the volatile matter evolved in this zone.

The stripping gas and stripped material from stripping and coking zone 14 are directed by means of line 21 into catalyst separator 22 wherein the entrained catalyst particles are separated from the gases. The gases from separator 22 may be directed through line 23 controlled by valve 24 into the plant fuel system after cooling or used hot or cold separately as a relatively low B. t. u. fuel gas. The separated catalyst is withdrawn from separator 22 by means of line 25 and is commingled with the withdrawn catalyst in line 17.

The oxidizing gas and commingled catalyst pass through line 19 into regenerator 2. In regenerator 2 the upward velocity of the gas is sufficient to form a relatively dense catalyst-gas phase in the lower portion thereof and a relatively light catalyst-gas phase in the upper portion thereof. The interface between these two phases is indicated by broken line 26. The effluent gases leave the light phase portion of the regenerator and pass through separator 27 wherein entrained catalyst particles are separated from the effluent gases. The separated catalyst particles are directed by means of conduit 28 into the dense phase of the regenerator and the effluent gases leave the separator by means of line 29 controlled by valve 30. The temperature in the regenerator will normally be within the range of 950 to 1200° F.

The regenerated catalyst carrying occluded oxidizing components is withdrawn from the regenerator through line 31 controlled by valve 32 and directed into stripper 33. In stripper 33 the catalyst is contacted with an upward flowing stream of light refinery gas, preferably $C_1$ and $C_2$ hydrocarbons introduced through line 34 controlled by valve 35 which strip the catalyst of the oxidizing components and are removed from the stripper by means of line 36. The stripping gases and stripped material carrying entrained catalyst fines are directed into separator 37 wherein said fines are removed from the gaseous stream and the latter by means of line 38 controlled by valve 39 is directed after cooling to the plant fuel system, or commingled with the effluent gas from separator 22, or used separately as a relatively low B. t. u. fuel. The separated catalyst is removed from separator 37 by means of line 40 and is commingled with the regenerated catalyst passing through line 5.

In order to aerate the catalyst streams passing through lines 5 and 17 suitable aerating gases may be introduced through lines 41 and 42, respectively, controlled by valves 43 and 44. The materials introduced through lines 41 and 42 may be the same as those introduced to the respective stripping zones 33 and 14.

When operating a fluidized type of cracking system according to the present invention, the air supplied to the regenerating zone may be reduced as much as 30% as compared to the conventional methods of operation. The heat which must be dissipated from the regenerator and adjacent equipment is proportionally reduced and the usable hydrocarbons and CO recovered in the strippers represent potential fuel which may be diverted to other uses in the plant.

I claim as my invention:

1. In a process for the catalytic conversion of hydrocarbons wherein finely divided catalyst particles are contacted in a reaction zone with hydrocarbons at conversion conditions, the resultant contaminated catalyst continuously withdrawn and contacted in a regeneration zone with oxygen-containing gas to remove the contaminant by combustion and the regenerated catalyst continuously withdrawn and returned to the reaction zone, the improvement which comprises passing said contaminated catalyst downwardly prior to its regeneration through a coking zone in countercurrent contact with upwardly flowing hot spent regenerating gas, the amount and temperature of said gas and the time of contact of the catalyst therewith being sufficient to reduce to low volatile coke and vapors the occluded and absorbed liquid hydrocarbons forming a part of the contamination on said catalyst, withdrawing thus treated catalyst from the bottom of said coking zone, removing said regenerating gas from the upper part of said coking zone and separating entrained catalyst therefrom, combining the separated entrained catalyst with catalyst withdrawn from the bottom of said coking zone, and passing the combined catalyst to said regeneration zone.

2. In a process for the conversion of hydrocarbons wherein solid catalyst particles are contacted in a conversion zone with hydrocarbons at conversion conditions, thereby contaminating the catalyst with hydrocarbonaceous matter, the method which comprises removing contaminated catalyst particles from said zone and contacting the same in a coking zone in countercurrent flow with a hot stripping gas, the amount and temperature of said gas and the time of contact of the contaminated catalyst therewith being sufficient to coke a substantial portion of the hydrocarbonaceous content of the contaminated catalyst, separately removing from said coking zone the major portion of the thus carbonized catalyst and the stripping gas containing resultant volatile matter and entrained carbonized catalyst, introducing the withdrawn stripping gas into a separation zone and therein separating said entrained carbonized catalyst, combining the thus separated catalyst with said major portion of carbonized catalyst, burning carbonaceous deposits from the combined carbonized catalyst to regenerate the latter, and returning thus regenerated catalyst particles to the conversion zone.

3. The method as defined in claim 2 further characterized in that said stripping gas comprises hot combustion gases resulting from said burning step.

4. In the conversion of hydrocarbons in contact with solid catalyst particles in a reaction zone wherein the catalyst is contaminated with hydrocarbonaceous matter, thus contaminated catalyst particles are removed from said reaction zone and regenerated by burning hydrocarbonaceous matter therefrom in a regenerating zone, and the regenerated catalyst is returned to the reaction zone, the improvement which comprises contacting said contaminated catalyst particles prior to regeneration thereof in countercurrent flow with a hot stripping gas in a coking zone, the amount and temperature of said gas and the time of contact of the contaminated catalyst therewith being sufficient to coke a substantial portion of the hydrocarbonaceous content of the contaminated catalyst, separately removing from said coking zone the major portion of the thus carbonized catalyst and the stripping gas containing resultant volatile matter and entrained carbonized catalyst, introducing the withdrawn stripping gas into a separation zone and therein separating said entrained carbonized catalyst, combining the thus separated catalyst with said major portion of carbonized catalyst, introducing the combined catalyst to said regeneration zone, and contacting said regenerated catalyst prior to its return to said reaction zone with a stripping gas comprising normally gaseous hydrocarbons in a stripping zone to remove occluded oxidizing components from said regenerated catalyst.

5. The improvement as defined in claim 4 further characterized in that said hot stripping gas comprises combustion gases removed from said regeneration zone.

LEV A. MEKLER.